United States Patent [19]
Verini

[11] Patent Number: 5,688,306
[45] Date of Patent: Nov. 18, 1997

[54] APPARATUS AND METHOD TO INTERMITTENTLY MANUFACTURE AND DISPENSE NITROGEN GAS

[76] Inventor: Nicholas A. Verini, 404 Lone Eagle Point, Lafayette, Colo. 80026

[21] Appl. No.: 646,505

[22] Filed: May 8, 1996

Related U.S. Application Data

[63] Continuation-in-part of Ser. No. 503,596, Jul. 18, 1995, Pat. No. 5,588,984.

[51] Int. Cl.$^6$ ............................................. B01D 53/22
[52] U.S. Cl. .................. 95/15; 95/18; 95/19; 95/51; 95/52; 95/54; 96/4; 96/7; 96/10; 55/218; 55/267
[58] Field of Search .................... 95/1, 14, 15, 18, 95/19, 22–24, 45, 51, 52, 54, 39; 96/4, 7–10; 55/267–270, 210, 217, 218

[56] References Cited

U.S. PATENT DOCUMENTS

| | | | |
|---|---|---|---|
| Re. 33,678 | 9/1991 | Campbell et al. | 96/4 X |
| 1,427,529 | 8/1922 | Gibbs et al. | |
| 3,140,931 | 7/1964 | McRobbie | 55/25 |
| 3,208,574 | 9/1965 | Anson | 194/3 |
| 3,976,451 | 8/1976 | Blackmer et al. | 96/7 |
| 3,979,190 | 9/1976 | Hedman | 96/7 |
| 4,180,388 | 12/1979 | Graham et al. | 96/8 X |
| 4,236,622 | 12/1980 | Stevenson | 194/87 |
| 4,289,225 | 9/1981 | Scholta | 19/9 |
| 4,348,213 | 9/1982 | Armond | 55/25 |
| 4,681,602 | 7/1987 | Glenn et al. | 96/4 X |
| 4,781,907 | 11/1988 | McNeill | 95/54 X |
| 4,810,265 | 3/1989 | Lagree et al. | 55/26 |
| 4,823,127 | 4/1989 | Jurek | 70/129 |
| 4,881,953 | 11/1989 | Prasad et al. | 96/10 X |
| 4,894,068 | 1/1990 | Rice | 95/52 X |
| 4,944,776 | 7/1990 | Keyser et al. | 96/8 X |
| 5,004,482 | 4/1991 | Haas et al. | 55/16 |
| 5,030,251 | 7/1991 | Rice et al. | 96/8 X |
| 5,053,058 | 10/1991 | Mitariten | 95/51 X |
| 5,069,692 | 12/1991 | Grennan et al. | 96/4 |
| 5,102,432 | 4/1992 | Prasad | 96/9 X |
| 5,118,327 | 6/1992 | Nelson et al. | 96/4 X |
| 5,131,929 | 7/1992 | Brockmann et al. | 96/4 X |
| 5,302,189 | 4/1994 | Barbe et al. | 95/54 |
| 5,378,263 | 1/1995 | Prasad | 96/9 X |
| 5,388,413 | 2/1995 | Major et al. | 62/11 |
| 5,425,801 | 6/1995 | Prasad | 95/54 X |
| 5,429,662 | 7/1995 | Fillet | 96/4 X |
| 5,470,379 | 11/1995 | Garrett | 96/4 |
| 5,496,388 | 3/1996 | Tellier | 96/4 X |
| 5,588,984 | 12/1996 | Verini | 95/15 |

FOREIGN PATENT DOCUMENTS

| | | | |
|---|---|---|---|
| 60-014923 | 1/1985 | Japan | 96/4 |
| 63-218232 | 9/1988 | Japan | 96/4 |
| 3-242305 | 10/1991 | Japan | 96/4 |

OTHER PUBLICATIONS

Goodyear Intr. Application Bulletin 17 (Sep. 1985) pp. 3–8.
Sperberg, Stronger Longer Tires of El Paso, Inc. (Jan. 1985) pp. 1–11.

*Primary Examiner*—Robert Spitzer
*Attorney, Agent, or Firm*—Thomas J. Loran

[57] ABSTRACT

The invention produces essentially pure nitrogen from air by an intermittent, automatic, and unattended process. Air is filtered, compressed and enters a nitrogen module containing a permeable membrane that selectively separates nitrogen from the air and discharges oxygen and other gases. Automated temperature and pressure controls allow the permeable membrane to separate air components. A discharge hose allows use of the nitrogen product for a variety of intermittent applications including vending for inflation of tires, filling portable nitrogen vessels, and use in manufacturing processes.

12 Claims, 2 Drawing Sheets

APPARATUS AND METHOD TO INTERMITTENTLY MANUFACTURE AND DISPENSE NITROGEN GAS

This patent application is a continuation-in-part of application Ser. No. 08/503,596 filed Jul. 18, 1995, now U.S. Pat. No. 5,588,984, the contents of which is hereby incorporated by reference.

BACKGROUND OF THE INVENTION

1. Field of the Invention

The present invention is generally directed to an improved apparatus and method for intermittent manufacturing nitrogen gas, separated from air, using a permeable membrane in an automatic and unattended process. Particularly, the improved method and apparatus eliminates a need for a nitrogen storage vessel and incorporates improved methods of maintaining membrane temperature while preventing moisture in air from forming liquid water that affects the air separation process. For very high purity nitrogen from the intermittent operation, an optional brief purge start-up period improves the purity. The nitrogen may be used in product manufacturing processes, inflating tires, vending to customers for tire inflation, filling portable nitrogen vessels, and other applications by people needing nitrogen.

2. Description of the Prior Art

Nitrogen manufacture from air by separating the oxygen and nitrogen has been accomplished by selective absorbent materials, distillation of liquid air, and membrane separation. These processes produce nitrogen for industrial uses such as chemical manufacture, inert gas welding, purging of explosive environments prior to electric arc cutting or welding, and food preservation. Also these processes are mostly continuous nitrogen production to the industrial process or to continually fill large storage containers. U.S. Pat. Nos. 5,302,189; 5,004,482; 4,810,265; 4,348,213; and 3,140,931 describe these manufacturing processes and industrial uses. The absorbent materials, although efficient, require regeneration of absorbent materials.

U.S. Pat. No. 5,388,413 describes a portable nitrogen source for continuously producing nitrogen at various sites with flow rates controlled by restrictor assembly (item 60, col. 3 line 67) adjusted manually to control operation. This patent uses a membrane for gas separation with air cooling and then air heating to provide proper temperatures to control the membrane temperature for gas separation. Although these provisions may be sufficient for continuous generation of nitrogen gas, the patent is not adequate to provide proper separation on start up or intermittent operation. Pressure controls are manually adjusted and temperatures are inadequate for proper gas separation until steady state production of nitrogen occurs. For intermittent and unattended production, immediate separation of nitrogen from air is needed when starting or oxygen will dilute the nitrogen. The prior art processes also require operators to produce the nitrogen gas.

U.S. Pat. Nos. 4,452,341; 4,289,225; 4,236,622; 3,208,574; and 1,427,529 relate to the intermittent supply of air. These patents supply air for inflating tires.

Publications such as Goodyear Application Bulletin no. 17 (09-85), Longer Tires, (01-95) describe the advantages of using nitrogen rather than air for safety, longer life, and therefore less cost. However, there is no system found in the prior art that provides compact, intermittent, and automatic production of essentially pure nitrogen for manufacturing, consumers, or tire inflation. Recently, improvements in permeable membrane designs permit improved nitrogen separation capacities that eliminates the need for nitrogen storage vessels in the invention.

SUMMARY OF THE INVENTION

The invention produces essentially pure nitrogen gas from air by an intermittent, automatic, and unattended process. Air is first filtered, compressed, and may be dehydrated or heated to prevent moisture condensation during the separation process. The air then enters a nitrogen module containing a permeable membrane that selectively separates nitrogen from the air and discharges oxygen and other gases. A discharge hose allows use of the nitrogen product for a variety of intermittent applications including inflation of tires, packaging of items in an inert atmosphere, making special mixtures of air with nitrogen, and allowing filling of portable vessels for use at other sites.

The membrane requires temperature control for ideal separation. The continuous temperature control of the module allows instantaneous and intermittent separation of the air's gaseous components through the permeable membrane. Heating the air and the module also prevents formation of moisture, or freezing of any moisture that may condense from the air. For proper separation of nitrogen from air, both air and nitrogen pressures must also be controlled. The combined pressure and temperature control at all times permits intermittent, immediate, and unattended manufacturing of nitrogen gas for consumer use or vending. A signal means for sensing a need to manufacture nitrogen from air automatically starts, produces, and ejects a desired amount of nitrogen gas.

A means for vending an amount of nitrogen for personal use may be added to the apparatus.

Accordingly, an object of the invention is to provide an apparatus and method for producing nitrogen from air by intermittent and immediate manufacturing, using a permeable membrane in an automatic and unattended process.

Another object of the invention is to eliminate the possibility of liquid water forming on the permeable membrane by moisture removal from air or air and/or heating apparatus components.

Another object of the invention is to provide an automatic means for maintaining proper pressures and temperatures during the nitrogen gas manufacturing operation and standby readiness.

Another object of the invention is to provide a means for vending of nitrogen to consumers for inflating tires and filling portable vessels.

Another object of the invention is to provide an automatic means for intermittent nitrogen supply for manufacturing processes.

DETAILED DESCRIPTION OF THE PREFERRED EMBODIMENT

Figure 1:
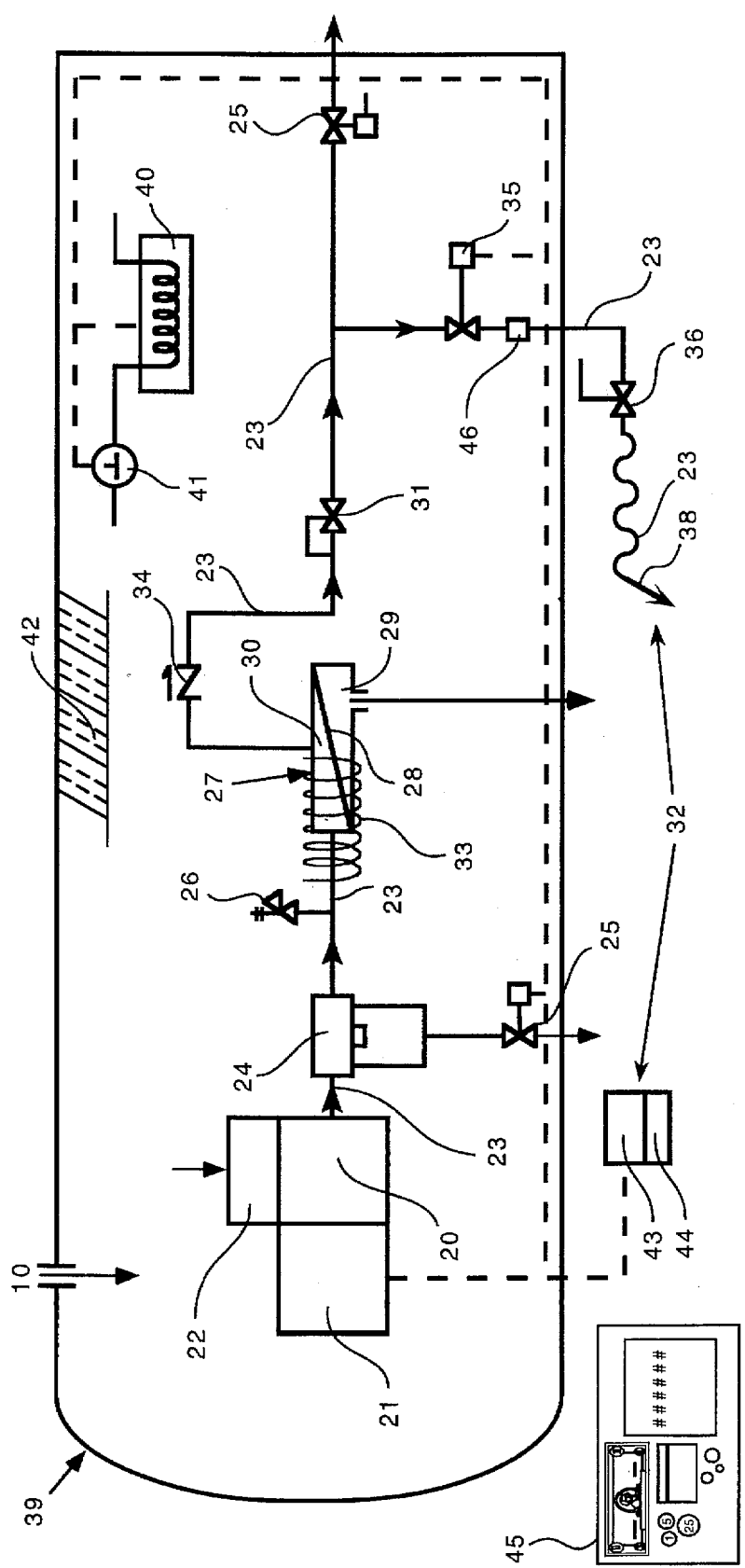
FIG. 1 is a schematic drawing of a method and apparatus to produce nitrogen from air by an intermittent, immediate, automatic, and unattended process.

The present invention method and apparatus shown in FIG. 1 includes an air compressor 20, preferably an oilless and reciprocating type, having an integral or attached electric motor 21 drawing atmospheric air 10 through a filter 22. If an oil type compressor is used, the filter should be downstream of the compressor to remove any contamination. The compressor is sized to produce the correct amount of air flow and to deliver desired nitrogen product quantities at a pressure required to separate nitrogen from air. The compressed air flows through conduit 23, constructed from plastic and/or metal tubing or pipe, either rigid or flexible, to an optional means for separating excessive moisture from the air 24. This moisture separating means includes a coalescing filter or similar device that removes the moisture with a means for draining liquid water 25. Moisture may also be removed from air by inducing centrifugal flow, selective absorbent or adsorbent, selective membrane separation, or other devices. In a coalescing filter moisture and other particles coalesce on a filter and fall to the coalescing filter bottom. The means for liquid water purging may be manual or preferably accomplished with an automatic valve 25 automatically activated by the intermittent cycles of operation or other time related device.

The compressed air then enters a permeable membrane module 27. This module comprises a membrane means 28 for essentially separating nitrogen from other air components 29. The membrane means for separating may be arranged singularly, parallel, or series constructed in hollow fiber form, or in spiral wound, pleated sheet or in any other desired configuration. The air enters the module and oxygen, carbon dioxide, moisture and other gases 29 pass through the membrane means for separating and are purged from the container while the nitrogen 30, enriches to desired purity by the removal of other air components, flows out of the module through a conduit 23. The materials used in the construction of membranes are described in U.S. Pat. No. 5,388,413. A manufacturer of the membrane is Medal$_{TM}$ in Newport, Del. For larger production capacities of nitrogen, a plurality of modules 27 may be added in parallel. For increased nitrogen purity, the modules may be added in series.

The separation process of nitrogen from air may be affected by the formation of liquid water on the membrane, the temperature of the membrane, and the pressure differential across the membrane means 28 for separating nitrogen from air. One method to lessen water formation is a means 24 for removing water. The water formation possibility may also be reduced by a means for controlling temperature in the module that includes heating the air prior to entrance into the compressor as explained below, using heaters such as electrical resistance conductive heaters 33, radiant heaters, or convection heaters, controlled by thermostats and positioned to heat the air in the apparatus and/or the module containing the permeable membrane. Heating the air in the conduit and the module by an electric resistance heater as shown in FIG. 1 is preferred. In warm environments, the heat necessary for apparatus operation may be provided by the environment surrounding the apparatus that warms the air and the module to the proper temperatures. Freezing temperatures of water are destructive to the apparatus operation.

An automatic back pressure control valve or a safety valve 26 is used to prevent over pressure of the system including the permeable membrane in the permeable membrane module. A valve setting in the range of 150 psig pressure is preferred although other pressures may also be set.

The nitrogen gas flows from the module through conduit 23 to a check valve 34 and to a means for automatic controlling nitrogen pressure in the module such as a back pressure valve 31. The purity of the nitrogen gas depends upon the pressures and temperature maintained in the module. Preferably, a back pressure valve that automatically controls the module pressure is recommended. However orifices, venturi restrictions, flow control valves, or other automatic means for controlling pressure may also be used. The back pressure controls the differential pressure between the nitrogen side and the exhaust gas side of the permeable membrane and the dwell time of the gas stream within the permeable membrane module 27. For example, a back pressure setting of 90 psig results in about 20 standard cubic feet of nitrogen gas per hour having a purity of 98%–99%. For this gas production rate, the compressor 20 is sized to be 2½ times larger capacity.

Nitrogen from the means for controlling back pressure flows through conduit 23 to a means for controlling and dispensing nitrogen 32. The means may include a solenoid or other automatic valve 35 and/or a manual operated valve 36. The means for controlling the module pressure may be located in the means for dispensing nitrogen. The combination of an automatic valve and a manual valve may be a control use in vending applications. A flow meter 46 may be added to indicate, control, or record the amount of nitrogen flow. A factory needing intermittent and automatic production of nitrogen could elect to use only an automatic valve or only a manual valve for a means for dispensing nitrogen. For tire inflation, filling portable vessels, or other uses, the means for dispensing nitrogen could include flexible hoses 23 and an air chuck 38.

A means for controlling and dispensing nitrogen 32 includes the operation of the electrical dispensing amounts and other components of the apparatus 43 attached to the apparatus. This means is designed to initiate the compressor on demand and any appropriate controls to produce a desired amount of nitrogen gas. The indication and control parameters in this means may include temperatures, pressures, valve positions, flow indicators or recorders, compressor power, timing devices, electrical power, and gas analyzers. Appropriate controls include compressor operation, discharge pressure, flow valves, and/or timing devices for these controls to allow determined amounts of nitrogen to be vended. One method would be a timing device to power the compressor until a determined amount of nitrogen gas is produced.

A means for vending nitrogen gas 44 allows customers to financially activate the invention apparatus to obtain a desired amount of nitrogen gas. The means for vending nitrogen gas includes activation by bills, coins, tokens, credit cards and codes such as numbers and or letters 45, to authorize the means to produce nitrogen gas. This device may be made tamper proof as described in prior art or other means. For applications where very pure nitrogen is needed, a means for venting the module, including vent 25 to bleed air from the module to atmosphere during starting for a few seconds until the module operating pressure is achieved may be added. This vent may be automated for a few seconds purge (depending upon the compressor size) and may increase purity about 1% of average amount for tire inflation. The means for venting may be achieved by opening the means for dispensing nitrogen to atmosphere for about 4 seconds before use.

Figure 2:
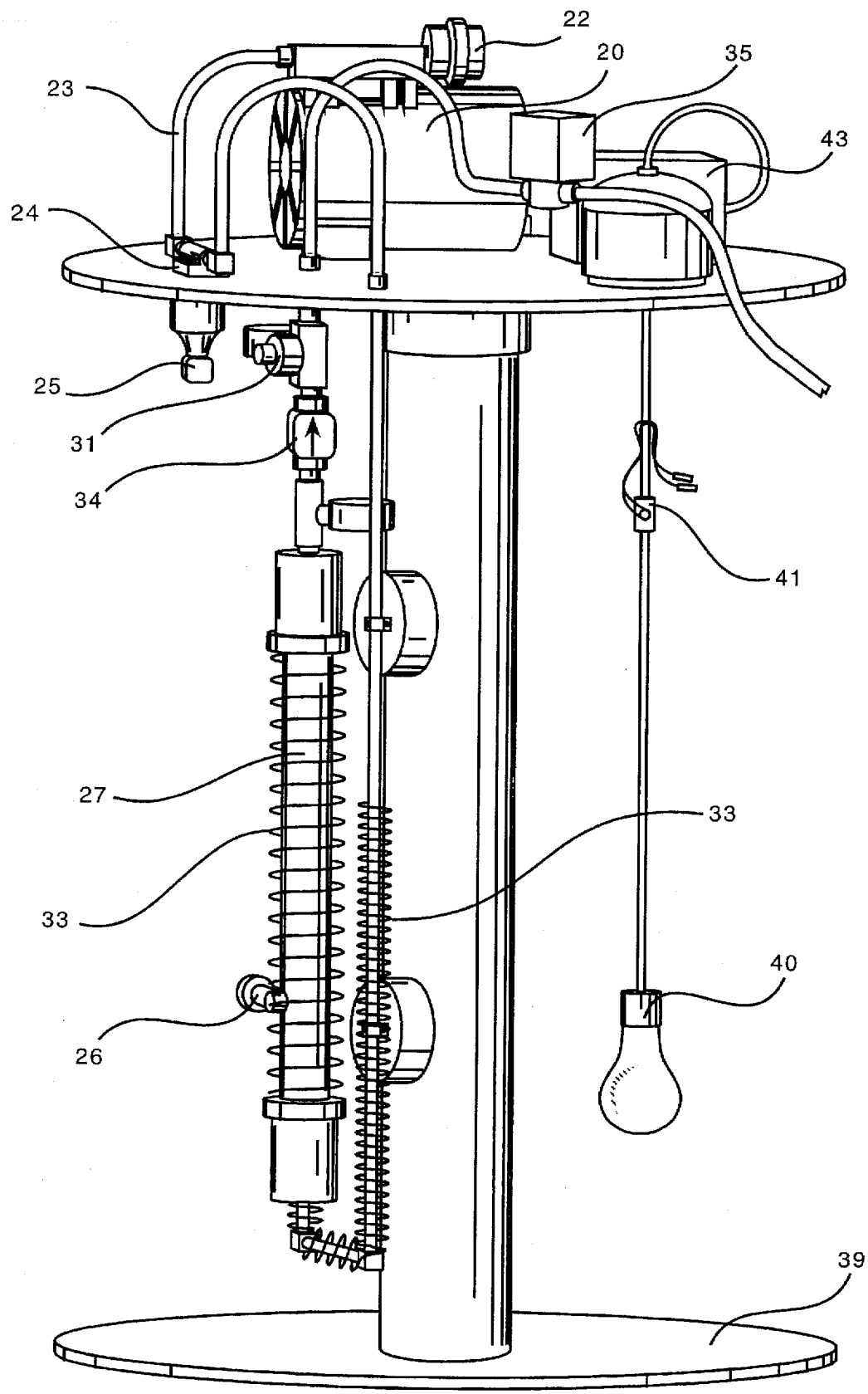
FIG. 2 is a perspective pictorial drawing of the apparatus in a sectional view showing one assembly method in an enclosed apparatus.

FIG. 2 is perspective pictorial view of the apparatus with the means for enclosing, partially removed, to show one of the many possible enclosure methods of the apparatus. An upper compartment encloses some of the apparatus as shown. The apparatus components are identified identically to FIG. 1.

The optional means for enclosing the apparatus 39 prevents tampering, allows access for maintenance, and aids in providing a temperature controlled environment. The enclosure is preferably constructed from metal surrounding the entire apparatus. The metals include aluminum, steel, and alloys of metals. Thermosetting plastics such as polyesters, nylons with or without reinforcing fibers may also be used. Some thermoplastic materials such as polypropylene, ABS, and PVC or other plastics with or without reinforcing may also be used. Where vandalism is not a problem, other materials such as wood may be used. The means for enclosing the apparatus may have compartments for various parts of the apparatus.

Providing a constant warm temperature of about 110° F. for the air and the permeable membrane module permits intermittent use with immediate production of nitrogen. Lower temperatures may also be possible. If the means for enclosing the apparatus 39 is used, the means for providing temperature control preferably uses electrical resistant heaters 40, thermostats 41, and insulation 42. Heat produced by the air compressor also aids in controlling the temperature of the nitrogen and components in the enclosure means. The inner surface of the means for enclosing the apparatus is insulated and the volume surrounding the apparatus is heated. The means for providing temperature control includes insulation made from inorganic materials including fiberglass and other fibers, organic materials including plastic foams, and wood products. Polyurethane foams and polystyrene foams are possible plastic foams. Biodegradable insulation may also be used. Plastic sheeting or layers are also included as insulation possibilities. A volume containing a vacuum may also provide the desired insulation.

A plurality of modules having a membrane for separating nitrogen gas from air may be added in parallel to increase nitrogen manufacturing quantities or in series to increase nitrogen purity.

From the above description of the invention, various changes and modifications to the apparatus will occur to those skilled in the art. All such modifications coming from within the scope of the appended claims are intended to be included therein.

I claim:

1. A method for intermittent and automatic separating nitrogen from air comprising the steps of:
   (a) compressing and introducing said air into a module containing a permeable membrane means for separating said nitrogen from said air,
   (b) said permeable membrane means separating said nitrogen from said air permitting oxygen, carbon dioxide, moisture and other gases to pass through said membrane means while enriching said nitrogen to a desired purity by removing other air components,
   (c) providing a means for automatic controlling nitrogen pressure in said module,
   (d) providing means for automatic controlling temperature in said module,
   (e) providing conduit to contain said air and nitrogen in said apparatus when necessary until discharge and,
   (f) providing a means for automatically controlling and dispensing desired amounts of said nitrogen.

2. A method for intermittent and automatic separating nitrogen from air as recited in claim 1 wherein said means for automatic controlling said nitrogen pressure in said module is a back pressure control valve.

3. A method for intermittent and automatic separating nitrogen from air comprising as recited in claim 1 wherein said means for controlling temperature in said module is a resistance heater.

4. A method for intermittent and automatic separating and storing nitrogen from air as recited in claim 1 further comprising a means for module purging.

5. A method for intermittent and automatic separating of nitrogen from air as recited in claim 1 wherein said means for automatically controlling and dispensing desired amounts of nitrogen contains a means for vending nitrogen activated by financial means selected from the group consisting of bills, coins, tokens, credit cards, and codes.

6. An method for intermittent and automatic separating of nitrogen from air as recited in claim 1 further comprising a means for separating water from said pressurized air.

7. An apparatus for intermittent and automatic separating of nitrogen from air comprising:
   (a) an air compressor for introducing pressurized said air to a module containing a permeable membrane means for separating said nitrogen from said air,
   (b) said permeable membrane means for separating said nitrogen from said air permits oxygen, carbon dioxide, water vapor, and other gases to pass through said membrane means for separating while said nitrogen enriches to a desired purity by removal of other air components,
   (c) a means for automatic controlling nitrogen pressure in said module,
   (d) a means for automatic controlling temperature in said module,
   (e) conduit to contain said air and said nitrogen in said apparatus when necessary until discharge and,
   (f) a means for automatically controlling and dispensing desired amounts of said nitrogen.

8. An apparatus for intermittent and automatic separating of nitrogen from air as recited in claim 7 wherein said means for automatic controlling said nitrogen pressure in said module is a back pressure control valve.

9. An apparatus for intermittent and automatic separating of nitrogen from air as recited in claim 7 wherein said means for controlling temperature in said module is a resistance heater.

10. An apparatus for intermittent and automatic separating of nitrogen from air as recited in claim 7 further comprising a means for venting said module.

11. An apparatus for intermittent and automatic separating of nitrogen from air as recited in claim 7 wherein said means for automatically controlling and dispensing desired amounts of nitrogen further comprising a means for vending nitrogen activated by financial means selected from the group consisting of bills, coins, tokens, credit cards, and codes.

12. An apparatus for intermittent and automatic separating of nitrogen from air as recited in claim 7 further comprising a means for separating water from said pressurized air.

* * * * *